Patented Apr. 24, 1923.

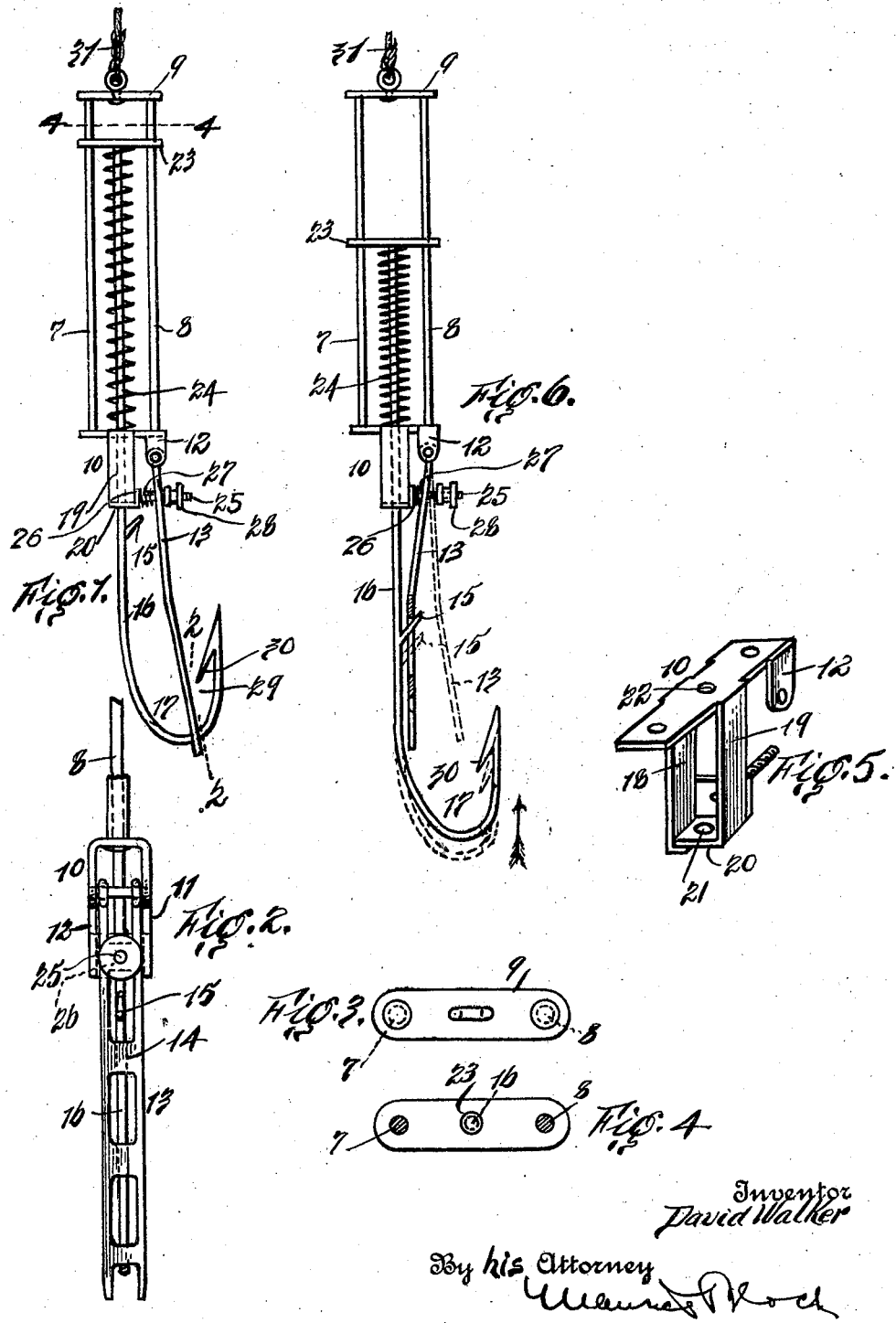

1,452,630

UNITED STATES PATENT OFFICE.

DAVID WALKER, OF NEW YORK, N. Y.

FISHING HOOK.

Application filed January 14, 1922. Serial No. 529,154.

*To all whom it may concern:*

Be it known that I, DAVID WALKER, a resident of New York city, county and State of New York, and a citizen of Austria, have invented certain new and useful Improvements in Fishing Hooks, of which the following is a specification.

This invention relates to improvements in fishing devices, one of the objects being to provide a hook mechanism arranged to prevent the escape of fish after the fish have taken the hook. My improved device is more especially intended for large game fish, such as blue-fish, etc.

I will now proceed to describe my invention in detail, the novel features of which I will point out in the appended claims, reference being had to the accompanying drawing, wherein:—

Fig. 1 is a side elevation of my improvement illustrated in normal condition;

Fig. 2 is a fragmentary sectional end view, the section being taken on line 2—2 in Fig. 1;

Fig. 3 is a top plan view illustrating the top plate;

Fig. 4 is a sectional view, the section being taken on a line 4—4 in Fig. 1;

Fig. 5 is a perspective view of the bracket at the lower end of the frame member; and Fig. 6 is a view similar to Fig. 1, illustrating the device in condition for use.

My improved fishing device, as herein illustrated, consists of a frame member made up of guide-rods 7 and 8, connected at their upper ends by a plate 9 and at their lower ends by a bracket 10. The bracket 10 includes ears 11 and 12 to pivotally support a latch 13 which in this instance is of lattice formation, one of the cross members 14 of which acts to cooperate with a catch 15 on the shank 16 of the hook 17 to lock the hook in its extended position, as indicated by full lines in Fig. 6. The bracket 10 is further provided with extension members 18 and 19 and a cross-plate 20 having openings 21 and 22 through which the shank 16 of the hook passes. The upper end of shank 16 is secured to a head 23 slidably mounted on the guide rods 7 and 8. Between head 23 and bracket 10, I place a relatively stiff spring 24 which surrounds shank 16 of hook 17. The extension of bracket 10 supports a threaded stud 25 which passes through the cross member 26 of the latch 13. Between latch 13 and cross-member 26 and around stud 25, I locate a spring 27 to normally force the latch 13 outwardly, as indicated by dotted lines in Fig. 6. The stud 25 carries an adjustable thumb nut 28 by means of which the outward position of latch 13 can be changed at will. For instance, when fishing for fish having a large thick lip, the distance 29 between latch 13 and barb 30 of the hook 17 will be changed by screwing nut 28 inwardly or outwardly in order that said latch will, when released, allow the end of the latch 13 to come in line with lip of the fish engaged by the hook. When a fish takes the hook and, as is usual, pulls on the hook, the hook will be extended to the dotted line position in Fig. 6, thereby pulling the catch 15 away from cross member or keeper 14, after which latch 13 will be forced outwardly by the spring 27 and away from catch 15, as indicated by dotted lines in Fig. 6. If the fish has a thick lip, the latch 13 would not, if not made adjustable, come in line with the end of the lip of the fish; therefore, the fish could tear himself off the hook. The latch will prevent the fish from tearing off the hook by moving in the direction of the arrow in Fig. 6, as it will aline with the engaged lip of the fish. When the fish moves in the direction of said arrow, the pull upon the spring will be released, and said spring will pull the hook, causing the barb of the hook to pass through the lip of the fish. The spring 24 acts independently of any pull upon the line 31 to move the hook longitudinally of the frame member. The frame may be encased in a casing representing bait, such as an eel skin, or a cedar jacket.

Having described my invention, what I desire to secure by Letters Patent is:—

1. In a fishing device, a frame member, a hook slidably mounted thereon, a latch pivotally connected thereto arranged to latch the hook in extended position, a spring to force the latch outwardly after it has been released, a spring to return the hook to normal position after the latch has been released, and means to adjust the movement of the latch.

2. In a fishing device, a frame member, a hook extensively supported thereby, a spring to return said hook, a latch carried by the frame, and a catch carried by the hook to engage the latch when said hook is extended, said catch being arranged to become disengaged from the latch when said hook is furthere extended by the pull of a fish thereupon, whereby said spring will pull the hook into the lip of the fish on the hook.

3. In a fishing device, a frame member, a hook movably mounted thereupon, a spring associated with the hook arranged to be placed under tension when said hook is moved to fishing position, means to maintain the hook in fishing position and also to maintain the spring under tension, said means being arranged to release the spring when a fish pulls upon the hook.

DAVID WALKER.